United States Patent [19]

Seibert

[11] Patent Number: 5,626,451
[45] Date of Patent: May 6, 1997

[54] WASHER FOR USE WITH EXTERIOR INSULATION

[75] Inventor: William B. Seibert, Birdsboro, Pa.

[73] Assignee: Wind-Lock Corporation, Leesport, Pa.

[21] Appl. No.: 542,380

[22] Filed: Oct. 12, 1995

[51] Int. Cl.⁶ .......................... F16B 33/00; F16B 43/00
[52] U.S. Cl. ............ 411/533; 411/531; 411/368; 411/369; 52/410; 52/512
[58] Field of Search .................. 411/533, 531, 411/368, 369; 52/410, 512

[56] References Cited

U.S. PATENT DOCUMENTS

| 212,549 | 2/1879 | Gear . |
|---|---|---|
| D. 263,678 | 4/1982 | Dewey . |
| D. 263,927 | 4/1982 | Dewey . |
| D. 263,928 | 4/1982 | Dewey . |
| 1,286,862 | 12/1918 | Williams . |
| 3,088,361 | 5/1963 | Hallock . |
| 3,090,203 | 5/1963 | Durget . |
| 4,030,261 | 6/1977 | Coleman . |
| 4,074,501 | 2/1978 | Sandqvist . |
| 4,361,997 | 12/1982 | DeCaro . |
| 4,380,413 | 4/1983 | Dewey . |
| 4,630,984 | 12/1986 | Reinwall et al. . |
| 4,663,910 | 5/1987 | Hasan . |
| 4,712,959 | 12/1987 | Hasan . |
| 4,757,661 | 7/1988 | Hasan . |
| 4,780,039 | 10/1988 | Hartman . |
| 4,884,932 | 12/1989 | Meyer . |
| 4,959,938 | 10/1990 | DeCaro . |
| 5,054,983 | 10/1991 | Froewis et al. . |
| 5,082,412 | 1/1992 | Thomas . |
| 5,118,235 | 6/1992 | Dill . |
| 5,139,379 | 8/1992 | Hasan et al. . |
| 5,171,118 | 12/1992 | Rothenbühler . |

FOREIGN PATENT DOCUMENTS 2711335  9/1978  Germany .

OTHER PUBLICATIONS

Wind–Lock Corporation Catalog No. 30, pp. 4–9, dated Jul. 6, 1994.

*Primary Examiner*—Rodney M. Lindsey
*Assistant Examiner*—Fredrick Conley
*Attorney, Agent, or Firm*—Howson and Howson

[57] ABSTRACT

A washer, for use with a fastener for attaching a slab of insulation and a covering mesh to a substrate, has fingers which automatically partially block its entry aperture when the fastener is tightened so that a finish applied over the washer does not fill the cavity of the washer. This reduces the conduction of heat through the insulation by way of the finish material and the fastener. It also provides an undercut surface for improved adhesion of the finish material to the washer.

19 Claims, 3 Drawing Sheets

WASHER FOR USE WITH EXTERIOR INSULATION

BRIEF SUMMARY OF THE INVENTION

This invention relates generally to a washer for use in exterior insulation finishing systems, and more particularly to a washer having an improved structure for automatic closure of its central passageway.

In modern building systems, insulation is frequently applied to the exterior sides of walls and to ceiling substrates. The insulation is generally in the form of a compressible slab of foam, for example expanded polystyrene or a compressible batt of semi-rigid, glass fiber-reinforced polyester. A covering mesh is applied to the face of the insulation to support a stucco, plaster or polymer finish. The slab of insulation and mesh are secured to the substrate by an array of fasteners, each fastener having a washer which bears against the mesh to hold the mesh against the insulation material. The stucco, plaster or polymer finish is applied over the insulation, covering mesh and washers to provide an aesthetic outer appearance to the building structure.

The typical washer used in exterior insulation finishing systems is in the form of a tubular hollow body having an annular skirt. The skirt extends transverse to the axis of the tubular body from one of the ends of the body, and prevents the fastener and washer from breaking through the insulation and covering mesh.

A problem with known washers used for this purpose is that the finish material, i.e. the stucco, plaster, etc., tends to fill the interior of the tubular body and conduct heat, thereby seriously diminishing the effectiveness of the of the insulation. Another problem is that washers are generally made from a plastics material to which the finishes do not adhere well.

Several washers have been designed to prevent formation of conducting channels. For instance, U.S. Pat. No. 5,118,235 to Michael C. Dill describes a washer having an integral flap which is used to close off the tubular hollow body after the washer and fastener are fastened to the substrate. U.S. Pat. No. 5,171,118 to Walter Rothenbühler discloses a washer having a plurality of flexible, sector-shaped parts projecting inwardly from an annular skirt for partially blocking the entrance of the hollow tubular body.

While the various known washers may function satisfactorily for their intended purposes, there remains a need for an improved washer capable of securing a compressible slab of insulation to a substrate, avoiding excessive heat conduction, and effectively preventing detachment of the finish coat.

The principal object of this invention, therefore, is to provide a washer having means for preventing finish from entering into the hollow tubular body of the washer after the washer has been fastened in place. It is also an object of the invention to provide means which automatically closes an entry aperture of the hollow tubular body after the washer is fastened in place. The automatic closure provides an adherence surface which effectively grips the hardened finish and blocks further entry of the finish material into the hollow tubular body.

The foregoing objects are achieved in accordance with the invention by providing a washer for use with a fastener having a head and a shank. The washer has a hollow body with a central passageway extending along an axis. At opposite ends of the central passageway is an entry aperture and a bottom aperture. The central passageway is capable of receiving the fastener through the entry aperture. An annular skirt extends in a transverse direction from the hollow body adjacent to the entry aperture. The hollow body has means engageable by the head of the fastener for preventing the head of the fastener from exiting the hollow body through the bottom aperture.

The improvement to the washer comprises at least one finger extending along the central passageway of the hollow body. Each finger has a portion located adjacent to the entry aperture. The improved washer has means for causing the portion of each finger adjacent to the entry aperture to move automatically radially inward toward the axis of the central passageway in response to tightening of the fastener. When the washer is fastened against the insulation and substrate, the fingers block the entry aperture.

More particularly, each finger is integrally connected in a semi-detached manner to the hollow body near the bottom aperture and extends along the central passageway to the annular skirt. Each finger has an upper extension which projects from the portion of each finger adjacent to the entry aperture in a direction outward and transverse to the central passageway. When the washer is fastened to a substrate, the compressible slab of insulation presses against the upper extensions forcing the fingers radially inward into the central passageway. Upon the tightening of the fastener, the fingers automatically move toward one another and partially block the entry aperture of the tubular hollow body. The fingers thereby prevent the finish material from filling the tubular hollow body and provide a surface to which the finish material will adhere effectively.

Further objects, details and advantages of the invention will be apparent from the following detailed description, when read in conjunction with the drawings.

DETAILED DESCRIPTION

Figure 1:
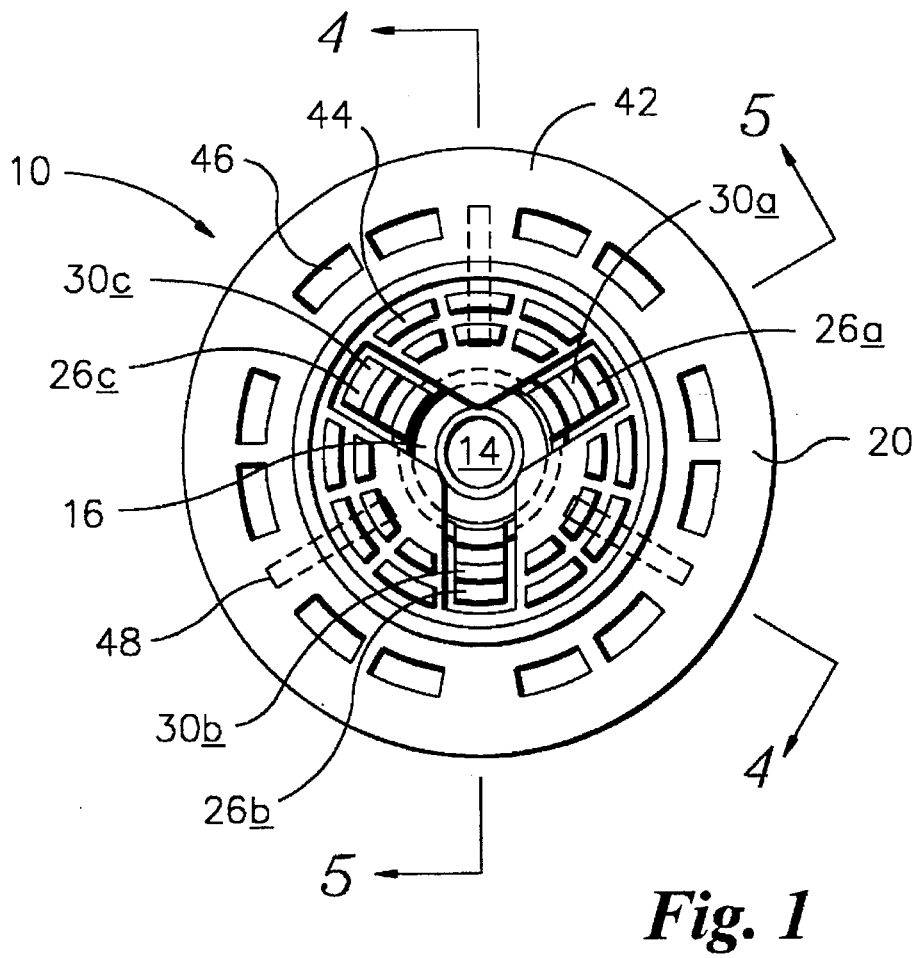
FIG. 1 is a front elevational view of a washer according to the invention.
Figure 2:
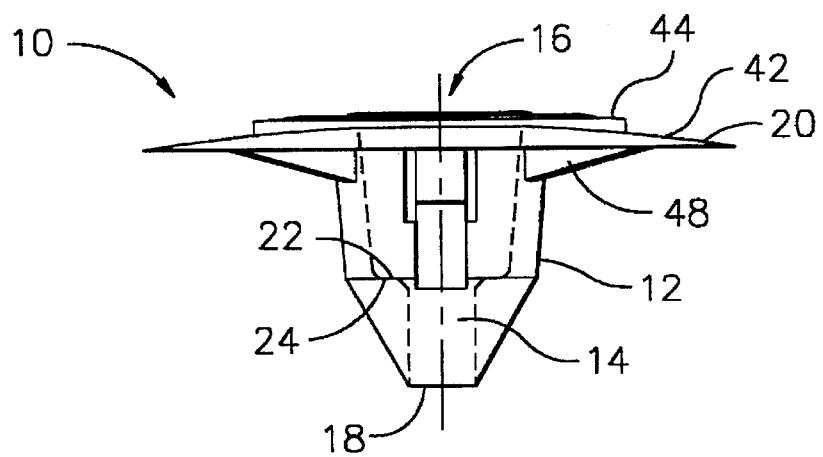
FIG. 2 is a bottom plan view of the washer.
Figure 3:
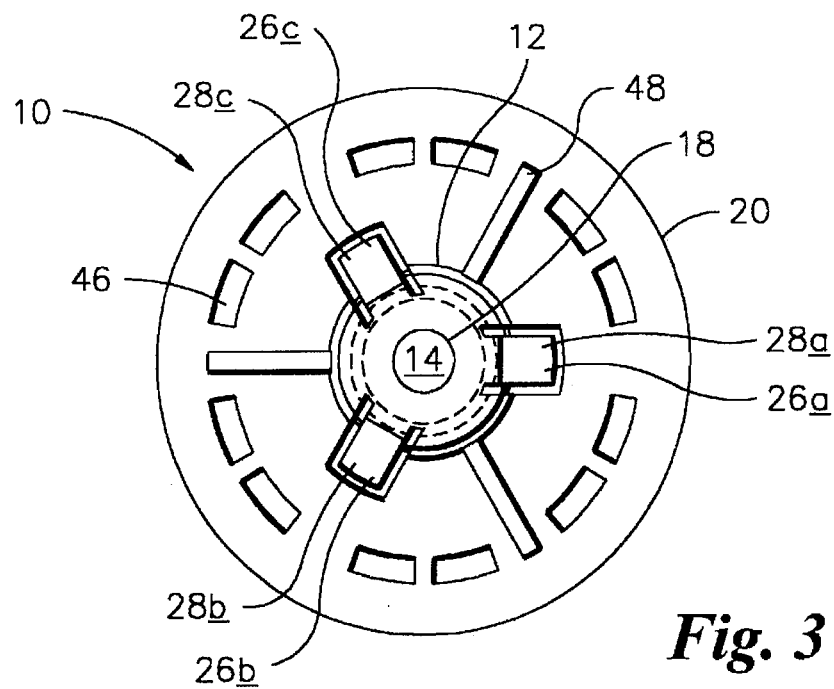
FIG. 3 is a rear elevational view of the washer.

FIGS. 1–5 illustrate a washer 10 specifically designed for use in fastening a compressible slab of insulation and a covering mesh to a wall or ceiling substrate. The washer 10 has an elongate hollow body 12 through which a fastener can extend. The hollow body 12 has a central passageway 14 extending along an axis defining an entry aperture 16 and a bottom aperture 18.

An annular skirt 20 extends in a transverse direction from the hollow body 12 adjacent to the entry aperture 16. The annular skirt 20 prevents the washer 10 from breaking through a compressible slab of insulation which would otherwise allow the slab of insulation to fall away from the wall substrate. The wall substrate can be, for example, wood or steel framing, sheathing and sidings such as plywood, strand board or metal, or masonry substrates such as block, poured concrete and brick.

Figure 4:
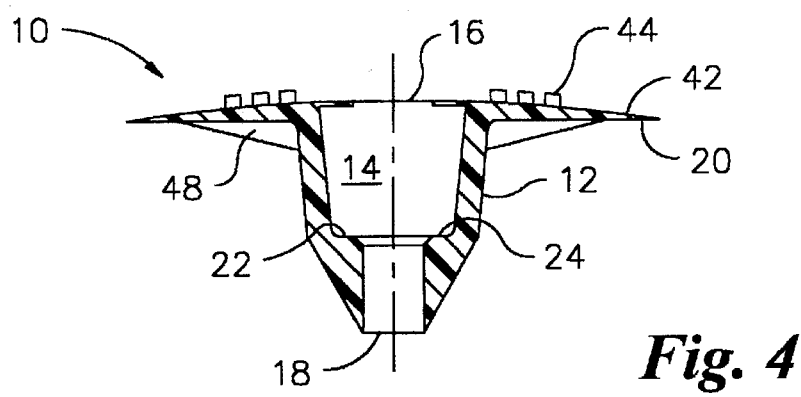
FIG. 4 is a cross-section of the washer taken on surface 4—4 of FIG. 1.
Figure 5:
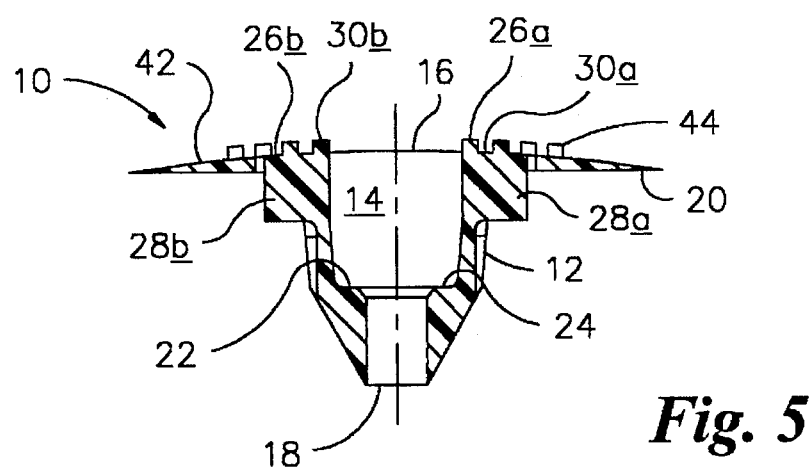
FIG. 5 is a cross-section of the washer taken on surface 5—5 of FIG. 1.

As best shown in FIGS. 4 and 5, the hollow body 12 has an interior shoulder 22, the radial surface 24 of which engages the head of a fastener and prevents the head of the fastener from passing through the bottom aperture 18.

Flexible fingers 26a, 26b and 26c extend along the central passageway 14. Each finger is integrally connected to the hollow body 12 adjacent to the shoulder 22. When the washer 10 is in an unfastened state, the fingers 26 extend parallel to the axis of the central passageway 14 along its periphery.

Each of fingers 26a, 26b and 26c, has an upper extension, 28a, 28b and 28c respectively. These extensions are located adjacent to the entry aperture 16, and project outwardly from the fingers in a direction transverse to the central passageway 14. Top surfaces 30a, 30b and 30c, of the extensions 28a, 28b and 28c respectively, form part of the annular skirt 20.

Figure 6:
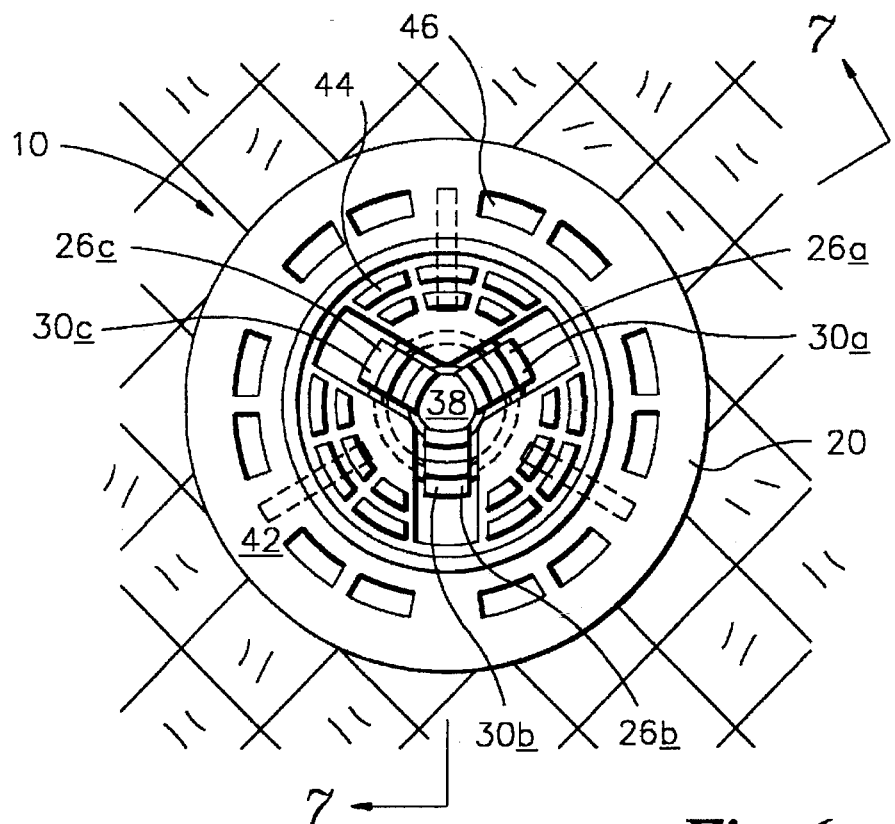
FIG. 6 is a front elevation showing the washer installed against insulation and a covering mesh.
Figure 7:
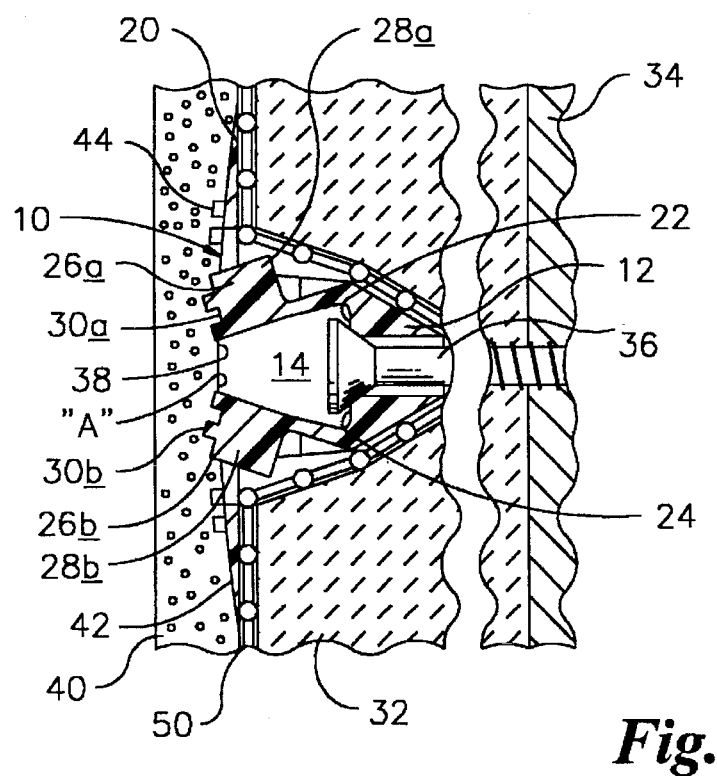
FIG. 7 is a cross-section taken on surface 7—7 of FIG. 6.

As shown in FIGS. 6 and 7, a fastener 36 is used with the washer 10 to fasten insulation 32 and a covering mesh 50 to a substrate 34. The insulation 32 engages the extensions 28a, 28b and 28c of the fingers, and, as the fastener is tightened, the insulation forces the fingers inward so that the top surfaces 30a, 30b and 30c partially block the entry aperture.

The inwardly extending fingers 26a, 26b and 26c provide a smaller entry aperture 38 which allows entry and exit of the shank of a screwdriver used to rotate the fastener 36. Aperture 38 is of a size such that the finishing material does not readily pass through it when the finishing material is applied. Thus, the three fingers 26a, 26b and 26c block the entrance to the central passage 14 via the aperture 16 sufficiently to prevent the aperture from being filled with finishing material, i.e. plaster, etc., when the finish is applied. Thus, the passage within the tubular body remains hollow and conduction of heat through the insulation by way of the finishing material and the fastener is minimized.

The inwardly extending fingers 26a, 26b and 26c also provide a structure to which finish 40 can readily adhere. As best shown in FIG. 7 at location "A", a small amount of finish enters the smaller entry aperture 38 and grips the backs of extensions 28a, 28b and 28c. Thus, the fingers provide an undercut surface which allows good adhesion of the finish to the washer.

To further aid the efficient adhesion of the finish 40 to the washer 10, the top surface 42 of the annular skirt 20 has a an array of outwardly extending projections 44. In addition, a series of apertures 46 extend through the annular skirt 20 to further provide surfaces for the adhesion of finish material. The washer 10 includes several stiffening ribs 48 to prevent excessive deformation of the annular skirt 20 under the stresses applied to the washer when it is tightened.

While a specific washer has been disclosed, many modifications may occur to persons skilled in the art which can be made without departing from the scope of the invention as defined in the following claims.

I claim:

1. A washer for use with a fastener having a head and a shank, comprising:
   a hollow body having a central passageway extending along an axis from an entry aperture to a bottom aperture, the central passageway being capable of receiving the fastener through the entry aperture;
   an annular skirt extending in a transverse direction from the hollow body adjacent to the entry aperture;
   means within said hollow body, engageable by the head of a fastener, for preventing the head of the fastener from exiting the hollow body through the bottom aperture;
   said hollow body having a plurality of fingers extending along the central passageway, each finger having a portion located adjacent to the entry aperture; and
   the washer having means for causing the portion of each finger adjacent to the entry aperture to move radially inward toward said axis in response to tightening of the fastener;
   whereby when the washer is fastened against a substrate, the finger at least partially blocks the entry aperture.

2. A washer according to claim 1, wherein each finger is integrally connected to the hollow body near the bottom aperture.

3. A washer according to claim 2, wherein the means for causing the finger to move inward has an upper extension projecting, from the portion of each finger adjacent to the entry aperture, in a direction outward and transverse to the central passageway, said upper extension being capable of forcing the portion into the central passageway when the washer is fastened against a substrate, and the substrate engages against the upper extension.

4. A washer according to claim 3, wherein the upper extension has a top surface, and wherein the top surface forms part of the annular skirt.

5. A washer according to claim 4, further comprising stiffening ribs connecting an underside of the annular skirt to an outer side of the hollow body.

6. A washer according to claim 5, wherein the annular skirt has a series of apertures extending from a topside to the underside of the annular skirt.

7. A washer according to claim 6, further comprising upwardly standing ribs extending from the topside of the hollow body and from the top surface of the upper extension.

8. A washer according to claim 7, wherein the hollow body has three fingers capable of extending inwardly into the central passageway when the washer is fastened against a substrate.

9. A washer according to claim 8, wherein the three fingers are symmetrically located along the central passageway.

10. An improved washer for use with a fastener to fasten an insulation product to an existing substrate, the fastener having a head and a shank, the washer having a hollow body defining a central passageway along a central axis, the central passageway has an entry aperture and a bottom aperture, the entry aperture permitting entry of the fastener through the central passageway, the hollow body having means engageable by the head of the fastener for preventing the head from exiting the hollow body through the bottom aperture, the washer having an annular skirt extending in a transverse direction from the hollow body adjacent to the entry aperture, the improvement comprising:
   a plurality of fingers extending along the central passageway, each finger integrally connected to the hollow body adjacent to the bottom aperture, and each finger having a portion located adjacent to the entry aperture; and
   means for causing said portion of each finger to move radially inward toward the central axis in response to tightening of the fastener;
   whereby the central passageway is closed nearest the entry aperture by the finger when the washer is fastened to the substrate through the insulation product.

11. An improved washer according to claim 10 wherein the means for causing the finger to move inward is an upper extension which projects outwardly from the portion nearest the entry aperture and in a direction transverse to the central passageway, the upper extension being capable of contacting against the insulation product, when the washer is fastened to the substrate the insulation product forces the upper extension and the portion into the central passageway.

12. An improved washer according to claim 11, wherein the upper extension has a top surface forming a part of the annular skirt.

13. An improved washer according to claim 12, further comprising a plurality of fingers formed in the hollow body and symmetrically located along the central passageway.

14. An improved washer according to claim 13, wherein when the plurality of fingers are forced inwardly into the central passageway, the plurality of fingers substantially close the entry aperture and form a second entry aperture smaller in diameter than the original entry aperture to allow the ingress and egress of a shank of a tool for fastening the fastener.

15. A washer for use in fastening an insulation product and covering mesh to an existing substrate and to which a finish is applied, comprising:

a hollow body having a central passageway extending along an axis and defining an entry aperture and a bottom aperture, the hollow body having a plurality of fingers extending along a portion of the central passageway; and an outer annular skirt extending transversely from the hollow body adjacent to the entry aperture;

wherein the each finger has means for allowing the finger to extend adjacent to the central passageway when the washer is in an unfastened state and to cause the finger to extend inwardly into the central passageway when the washer is fastened against the insulation product and mesh.

16. A washer according to claim 15, wherein the means is an upper extension projecting outwardly from each finger and transversely to the central passageway, the upper extension being capable of contacting the insulation product which forces each finger inwardly into the central passageway.

17. A washer according to claim 16, wherein a top surface of the upper extension forms part of the annular skirt.

18. A washer according to claim 17, each inwardly extending finger forms an adhering surface for the finish to adhere to and prevents the finish from completely filling the central passageway.

19. A washer according to claim 18, wherein the hollow body has three fingers which are symmetrically located along said central passageway.

* * * * *